June 7, 1932. S. A. FARRELL 1,862,471
POWER AND MOTION TRANSMISSION MECHANISM
Original Filed Sept. 13, 1929  2 Sheets-Sheet 1
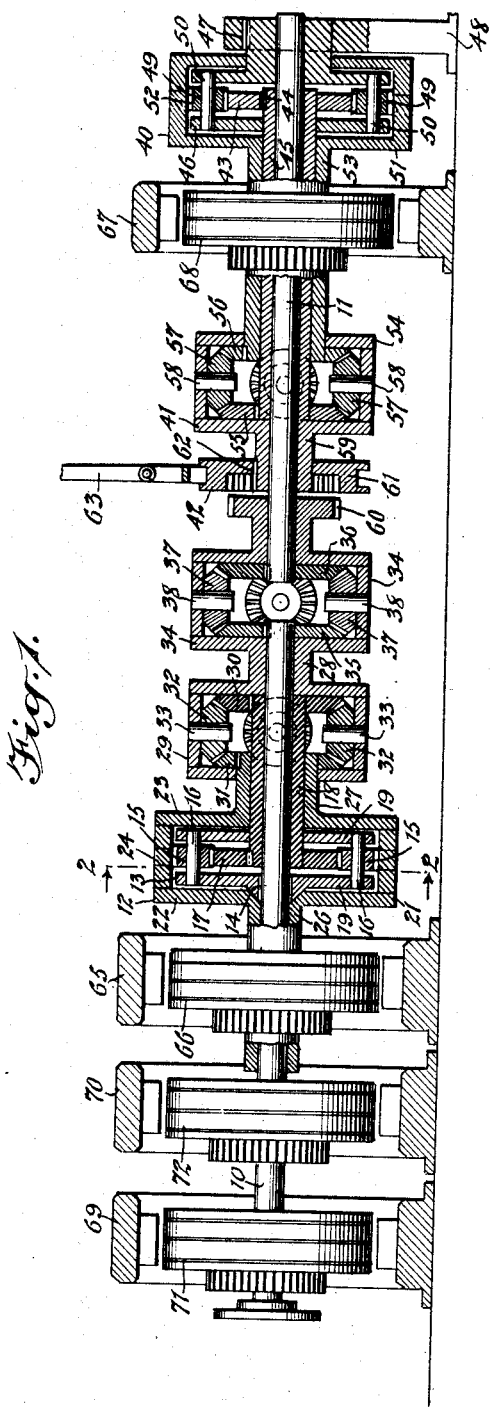
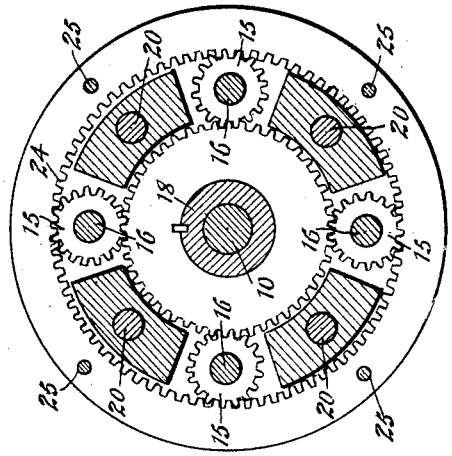
INVENTOR
Stephen A. Farrell
BY
ATTORNEYS June 7, 1932.  S. A. FARRELL  1,862,471
POWER AND MOTION TRANSMISSION MECHANISM
Original Filed Sept. 13, 1929   2 Sheets-Sheet 2
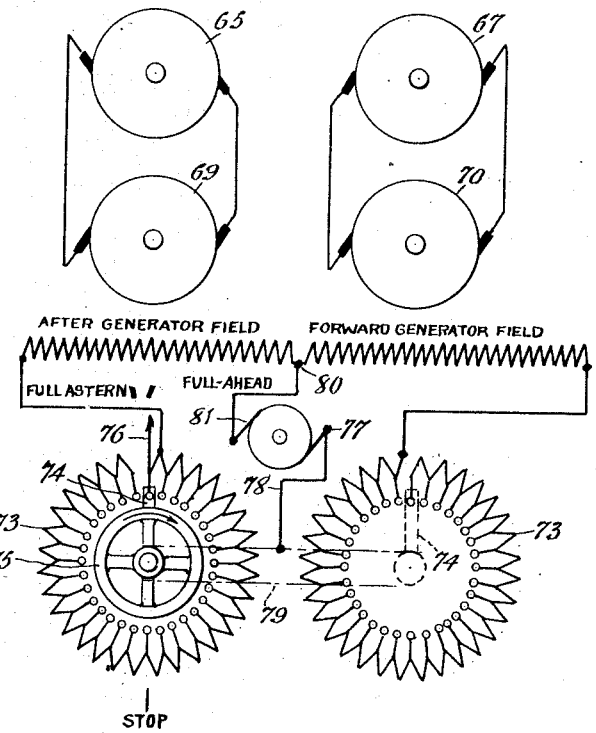
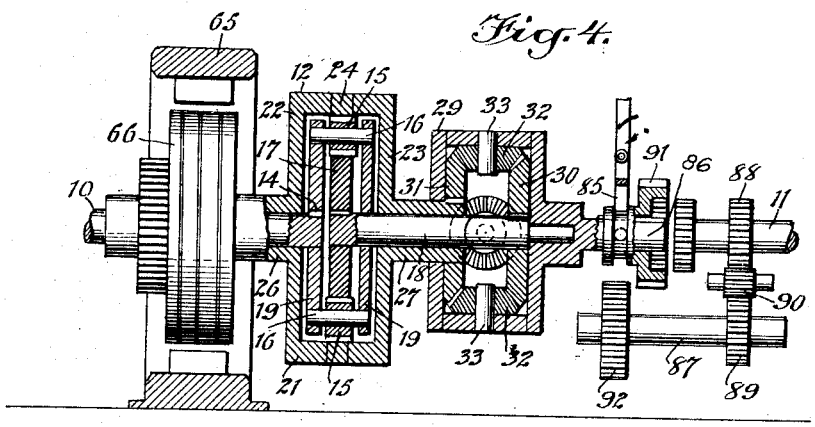
WITNESSES
INVENTOR
Stephen A. Farrell
BY
ATTORNEYS Patented June 7, 1932

1,862,471

UNITED STATES PATENT OFFICE

STEPHEN A. FARRELL, OF BROOKLYN, NEW YORK

POWER AND MOTION TRANSMISSION MECHANISM

Application filed September 13, 1929, Serial No. 392,442. Renewed November 11, 1931.

This invention relates to a power and motion transmission mechanism designed and adapted for power driven vehicles for roads and rails, and also for marine and air craft, and other devices and machines requiring variable progressive speeds.

An object of the invention is the provision of an improved mechanism of the indicated character for transmitting power and also for obtaining direct and reverse variable speeds within the range from zero to full speed.

Another object is the provision in a mechanism of the indicated character of improved means for controlling the transmission of power and motion without divorcing or separating the prime mover from the load.

With the foregoing and other objects in view, the invention resides in the combinations, constructions and operations of the parts hereinafter fully described and illustrated in the accompanying drawings, in which:

Figure 1 is a sectional elevation of one form of mechanism of the present invention;

Fig. 2 is an enlarged transverse section taken on the line 2—2 of Fig. 1;

Fig. 3 is a diagrammatic view of the control means of the mechanism;

Fig. 4 is a sectional elevation of a modified form of mechanism.

Referring now to Figs. 1 and 2 of the drawings it will be apparent that there is shown a driving shaft 10 and a driven or propeller shaft 11. The driving shaft will be operated by any suitable prime mover such as a Diesel engine or turbine engine connected directly with the shaft 10. A planetary locking gear set 12 is geared with the driving shaft 10. The gear set 12 consists of a carrier 13 keyed as at 14 to the drive shaft 10 to rotate therewith. Planetary pinions 15 are arranged on the carrier 13 to travel therewith, and also for rotation relative thereto, each of said pinions being mounted on a shaft 16 secured to the carrier 13 against rotation. An external gear 17 is fast on a hollow shaft 18 surrounding the shaft 10 on which it may rotate. The carrier 13 consists of two circular plates 19 which are held in spaced relationship by fastening elements such as the bolts 20. A box 21 consisting of parts 22 and 23 surrounds the carrier 13. An internal gear 24 is positioned between the parts 22 and 23, and said parts together with the gear 24 are fastened together by suitable fastening elements such as the bolts 25. The part 22 of the box 21 has connected or formed integral therewith a hollow shaft 26 which loosely surrounds the driving shaft 10, and the part 23 of the box has connected or formed integral therewith a hollow shaft 27 which loosely surrounds the shaft 18. A double planetary gear set 28 is geared with the driving shaft 10, driven shaft 11, and the gear set 12. The gear set 28 consists of a box 29, beveled gears 30 and 31 arranged within the box 29 and keyed respectively to the shafts 18 and 27, and beveled gears 32 arranged within the box 29 which mesh with the gears 30 and 31, each of the gears 32 being freely rotatable on a stub shaft 33 carried by the box 29. The gear set 28 also includes a box 34 similar to the box 29 and connected or formed integral therewith, beveled gears 35 and 36 arranged within the box 34 and keyed respectively to the drive shaft 10 and the driven shaft 11, and beveled gears 37 arranged within the box 34 meshing with the gears 35 and 36, each of said gears 37 being freely rotatable on a stub shaft 38 carried by the box 34.

In the present instance the external gear 17 of the gear set 12 is two-thirds the size of the internal gear 24, and each of the beveled gears 30, 31, 35 and 36 are equal in diameter to the external gear 17. It is to be understood, however, that the sizes of these gears may be varied according to the locking effect desired and the speed to be applied on the control shaft 26.

The gear sets hereinbefore described are employed in conjunction with gear sets 40 and 41, the former being a locking gear set. The gear sets 40 and 41 are coupled with and are uncoupled from the gear sets 12 and 28 by a clutch 42.

The gear set 40 consists of an external gear 43 keyed as at 44 to a hollow shaft 45 which loosely surrounds the driven shaft 11, and a carrier 46 which is securely anchored or keyed as at 47 with a stationary part or bearing 48. The carrier 46 is constructed similarly to the carrier 13 of the gear set 12. Planetary pinions 49 are arranged on the carrier 46 for rotation relative thereto, each of said pinions being freely rotatable on a shaft 50 secured to the carrier 46 against rotation. A box 51 carries an internal gear 52. The box 51 has connected or formed integral therewith a hollow shaft 53 which is loosely arranged on the shaft 45. The pinions 49 are in mesh with the external gear 43 and the internal gear 52.

The gear set 41 consists of a box 54, beveled gears 55 and 56 arranged within the box and respectively keyed to the shafts 45 and 53, and beveled gears 57 arranged within the box 54 which mesh with the gears 55 and 56, each gear 57 being freely rotatable on a stub shaft 58 carried by the box 54, and there being a hollow shaft 59 connected or formed integral with the box 54 which loosely surrounds the driven shaft 11.

The lock gear set 40 is substantially similar to the gear set 12, with the exception as described above, the carrier 46 is anchored or is prevented from rotating, whereas the carrier 13 of the gear set 12 is free to rotate with the dive shaft 10. It is also to be understood that the gears 55 and 56 of the gear set 41 are equal in diameter to the external gear 43.

The clutch 42 consists of an element in the form of an external gear 60 connected or formed integral with the box 34, an element in the form of an internal gear 61 keyed as at 62 on the shaft 59 for axial movement with respect thereto and rotation therewith, and a lever 63 for moving the gear 61 into and out of mesh with the gear 60 for the purpose of coupling the gear sets 40 and 41 with the gear sets 12 and 28, and also for uncoupling the former from the latter.

Electrical means is provided for controlling the epicyclic train of the gear sets 12 and 28, and also the gear sets 40 and 41. For the gear sets 12 and 28 there is provided a motor 65 whose armature 66 is mounted fast on the shaft 26. For the gear sets 40 and 41 use is made of a motor 67 whose armature 68 is fast on the shaft 53. Use is also made of two generators 69 and 70. In the present instance the armatures 71 and 72 respectively of the generators 69 and 70 are fast on the driving shaft 10. The fields of the generators are electrically connected in circuit with rheostats 73 for inverse synchronous control of the motors 65 and 67, so that when one motor is running at full speed the other motor will be stopped. The contact arms 74 of the rheostats 73 are moved in unison by operating a hand wheel 75. The arbor of the hand wheel 75 carries a pointer 76 which moves relatively to the indexes "Full ahead", "Stop", and "Full astern" to indicate propeller shaft speed at those points. Current flows from the source at 77 to the connection 78 on the shaft 79 which carries the arms 74, through said arms. The current divides on the shaft 79 and flows inversely as the resistance of the two circuits shown, and unites at the connection 80 and flows back to the source at 81. The generator armatures need not be mounted on the driving shaft 10, but may be driven from the prime mover in any suitable manner. The motor armatures instead of being mounted on the shafts 26 and 53 may be geared to these shafts.

Attention is now called to the following facts: The gears 24 and 17 are of unequal diameters, the gear 17 being two-thirds the size of gear 24. Consequently there is presented a difference in leverage: the leverage of gear 24 being greater than the leverage of gear 17 at the ratio of three to two. Accordingly any strain placed on the gears 15 will divide at a ratio of three to two. Therefore the torsional strain from shaft 10 becomes two strains when it leaves carrier 13 but both in the same direction. When these strains arrive on gears 32 they may be in accord to turn gears 32 in their orbit around shaft 18, or they may be in opposition to turn gears 32 on their axes 33. It follows therefore that two parts of the strain placed on gears 32 by the gear 30 will be opposed by three parts placed on the gears 32 by the gear 31 leaving a one-fifth preponderance of strain in favor of gear 31. The friction moment of the epicyclic train is equal to one-fifth of the strain imposed upon carrier 13 by the prime mover and also the one-fifth preponderance of the gear 31. It follows therefore that the friction moment of the epicyclic train is as great as the strain moment which is trying to turn the train, consequently they will neutralize each other and cancel out.

It will be understood from the foregoing that the mechanism described is one which is designed and adapted for marine and air craft for transmitting power in either direction, that is to say, direct or reverse directions at any increment of speed from zero to full speed, without divorcing the prime mover from the load.

When it is desired to transmit motion to the driven shaft 11 from the drive shaft 10 in the same direction, the prime mover is started. Let us assume that the prime mover drives the shaft 10 in a counterclockwise direction looking at said shaft from the left hand end in Fig. 1. Torsional strain imposed upon the driving shaft 10 will be transmitted to the carrier 13. From the carrier 13 the strain will be transmitted to the shaft 16 and from said shaft to the pinions 15. The strain imposed upon the pinions 15 is divided, part of it going to the gear 24, box 21, shaft 27 and gear 31. The other part of said strain goes to the gear 17, shaft 18 and gear 30. It should be understood that both parts of this divided strain were transmitted to the gears 30 and 31 in a counterclockwise direction. This divided strain unites on the gears 32 which causes the boxes 29 and 34 to turn in a counterclockwise direction. Although the strains imposed by the gears 30 and 31 on the gears 32 are unequal, due to the difference in leverage pointed out hereinabove, equality is nevertheless obtained because the friction movement of the epicyclic train of the gear sets 12 and 28 is neutralized or canceled out by the one-fifth preponderance of the strain moment trying to turn the epicyclic train. It follows therefore that both the box 34 and the gear 35 will be rotating counterclockwise at the same speed as the driving shaft 10, consequently the gears 37 carried by the box 34 will transmit similar movement and speed to the driven shaft 11. By starting the motor 65 to run counterclockwise at a greater speed than the speed of the driving shaft 10, and while the latter is rotating, the gear 24 will be rotating at a speed equal to that of the motor 65, consequently the pinions 15 will rotate on their axes 16 causing the gear 17 to rotate in a clockwise direction at a faster rate of speed than the gear 24. Due to the difference in size of the gears 24 and 17, the gear 17 will rotate one and one-half revolutions to each revolution of the gear 24. It follows therefore that the gears 30 and 31 will be rotating in opposite directions, the gear 31 rotating in a counterclockwise direction while the gear 30 rotates in a clockwise direction, the latter rotating one and one-half revolutions to one revolution of the gear 31. The gears 32 being free to rotate will do so by reason of being geared with the gears 30 and 31, and due to the difference in speeds of the gears 30 and 31, the boxes 29 and 34 will rotate in a clockwise direction at half speed. At this time the driven shaft 11 will be at a stand-still. It will therefore be understood that by varying the speed of the motor 65, the speed of the driven shaft 11 may be varied progressively to any increment of speed from zero to full speed and vice versa.

In order to cause the reverse rotation of the driven shaft 11 in response to the direct rotation of the driving shaft 10, and also to sustain the load of reaction, the clutch element 61 is moved into engagement with the clutch element 60, while the boxes 29 and 34 of the gear set 28 are rotating. This is accomplished by running the motor 67 to turn the shaft 53 clockwise. This will cause the gear 56 to turn clockwise and the gear 55 to turn counterclockwise through the intervention of gears 57. It will also be apparent that the gear 52 will be rotating clockwise and the gear 43 will be turning counterclockwise through the intervention of the pinions 49. The gear 43 being smaller than the gear 52 will rotate one and one-half revolutions to one revolution of the gear 52. It will therefore be obvious that the gear 55 will be rotating faster than the gear 56, causing the box 54 to rotate in a counterclockwise direction. The speed of rotation of the box 54, and therefore the gear 61 will be equal to the speed of rotation of the gear 60, both rotating in the same direction. The lever 63 may then be manipulated to move the gear 61 into engagement with the gear 60. The motor 67 may then be stopped. This will cause gears 43 and 52 to lock with the pinions 49 of the gear set 40; it being apparent that the carrier 46 is held, as at 47 against rotation in either direction. The reason the gears 43 and 52 lock with the pinion 49 is because the box 54 will be carried around in a counterclockwise direction, causing the pinions 57 to apply strain equally on the gears 55 and 56 in the same direction. By holding the boxes 29 and 34 of the gear set 28, the continued rotation of the driving shaft 10 will cause the reverse rotation of the driven shaft 11 at the same speed, through the intervention of the gear 35, pinions 37 and gear 36. It will also be understood that by running the motor 65, the driven shaft 10 may be rotated in a reverse direction at variable progressive speeds within the range from zero to full speed.

In Fig. 4 of the drawings there has been shown a modified-form of mechanism with a conventional reversing gear. This mechanism will be adapted for auto-vehicles for roads and rails, such as locomotives, heavy automobiles, trucks and buses which require fast, smooth starting. The mechanism shown in Fig. 4 consists of a planetary locking gear set the same as the gear set 12 hereinbefore described, and a gear set equivalent to one-half of the gear set 28 hereinbefore described, together with one motor employed in the same manner as the motor 65. In Fig. 4 similar reference numerals will be applied to corresponding parts shown in Fig. 1. The reversing means shown in Fig. 4 of conventional form includes a clutch 85 interposing a stub shaft 86 on the box 29 and the driven shaft 11, together with a counter shaft 87 geared to the shaft 86 by gears 88 and 89 respectively keyed to the shafts 86 and 87, and an intermediate idler pinion 90. The slidable element of the clutch 85 has teeth 91 which mesh with the teeth of a reverse gear 92 keyed to the counter shaft 87. It will be apparent that by driving the shaft 10 in a counterclockwise direction with a prime mover, carrier 13 and the pinions 15 carried thereby will travel with the shaft 10, the pinions moving in their orbit. This will cause gears 17 and 24 to rotate counterclockwise at the same speed, also the gears 30 and 31 which are connected respectively with said gears 17 and 24, strain will be imposed upon the pinions 32 by the gears 30 and 31 and therefore the shafts 33, causing the box 29 to rotate in a counterclockwise direction at the same speed as the driving shaft 10. This motion and power may be transmitted to the driven shaft 11 when the clutch 85 is engaged. The motor 65 may be run at a speed to cause the shaft 26 to rotate in a counterclockwise direction at a faster speed than the driving shaft 10, which will cause the gear 24 to rotate counterclockwise at the same speed as the shaft 26, and the gear 17 to rotate at a faster speed than the gear 24 in a clockwise direction. Consequently the gears 30 and 31 will rotate respectively clockwise and counterclockwise at different speed, the gear 30 rotating faster or at a speed equal to that of the gear 17, while the gear 31 rotates at a speed equal to that of the gear 24. This will cause the box 29 to rotate in a clockwise direction. The speed of rotation of the box 29 may be reduced to zero which allows the clutch 85 to be operated to bring the teeth 91 in mesh with the teeth of the gear 92. By stopping the motor 65, the box 29 will be rotated in a counterclockwise direction causing the driven shaft 11 to rotate reversely to the driving shaft 10. The motor 65 may then be run at any desired speed above that of the driving shaft 10 to cause the driven shaft 11 while rotating in a reverse direction to rotate at any increment of speed from zero to full speed.

What is claimed is:

1. In a mechanism of the class described, the combination of a power drive shaft, a planetary locking gear set gearing with said drive shaft, a second planetary gear set gearing with said first planetary gear set, said second planetary gear set including a rotatable box; and means to operate said first planetary gear set to vary the speed of rotation of said box from zero to full speed.

2. In a mechanism of the class described, the combination of a power drive shaft, a planetary locking gear set gearing with said drive shaft, a second planetary gear set gearing with said first planetary gear set, said second plentary gear set including a rotatable box; and an electric motor, the armature of said motor being secured to a rotatable part of said first planetary gear set to operate the latter to vary the speed of rotation of said box from zero to full speed.

3. In a mechanism of the class described, the combination of a drive shaft, a carrier secured to said drive shaft to rotate therewith, pinions arranged on said carrier for rotation relative thereto, an internal gear, an external gear, said pinions being in mesh with said internal and external gears, and an electric motor whose armature is operatively connected with said internal gear, to rotate the latter at a rate of speed exceeding that of the drive shaft.

4. In a mechanism of the class described, the combination of a power drive shaft, a planetary gear set gearing with said drive shaft, a second planetary gear set gearing with said first planetary gear set, a driven shaft operated by said second planetary gear set, means to operate said first planetary gear set to vary the speed of said driven shaft from zero to full speed while said drive shaft is rotating full speed, and means adapted to be coupled with said second planetary gear set to cause the epicyclic operation of the gear train of said gear sets, to cause the reverse rotation of said driven shaft in response to the direct rotation of said drive shaft.

5. In a mechanism of the class described, the combination of a power drive shaft, a motor driven planetary locking gear set gearing with said drive shaft, and a second planetary gear set gearing with said first gear set, said second gear set including a driven rotatable element.

6. In a mechanism of the class described, the combination of a power drive shaft, a motor driven planetary gear set gearing with said drive shaft, and a double planetary gear set gearing with said first gear set, said double gear set including a driven rotatable element; a propeller shaft, a clutch interposing said rotatable element and the propeller shaft, and reversing means gearing with said propeller shaft, said clutch being adapted for operation to couple said reversing means with said rotatable element and to uncouple the same therefrom.

7. In a mechanism of the class described, the combination of a power drive shaft, a planetary gear set gearing with said drive shaft, a double planetary gear set gearing with said first planetary gear set, a driven shaft operated by said double planetary gear set, means to operate said first planetary gear set to vary the speed of said driven shaft from zero to full speed while said drive shaft is rotating full speed, and motor driven means adapted to be coupled with said double planetary gear set to cause the epicyclic operation of the gear train of said gear sets, to cause the reverse rotation of said driven shaft in response to the direct rotation of said drive shaft.

8. In a mechanism of the class described, the combination of a power drive shaft, a planetary gear set gearing with said drive shaft, a double planetary gear set gearing with said first planetary gear set, a driven shaft operated by said double planetary gear set, means to operate said first planetary gear set to vary the speed of said driven shaft from zero to full speed while said drive shaft is rotating full speed, and means adapted to be coupled with said double planetary gear set to cause the epicyclic operation of the gear train of said gear sets, to cause the reverse rotation of said driven shaft in response to the direct rotation of said drive shaft, said last mentioned means including a locking planetary gear set which sustains the load reaction on the driven shaft when rotating in a reverse direction.

9. In a mechanism of the class described, the combination of a driving shaft, a driven shaft and gearing interposing said shafts and including gears respectively secured to said shafts, said gearing operating to lock itself to prevent retrograde rotation of the driven shaft due to load reaction on said driven shaft, and said gearing also being operative to transmit variable speeds from the driving shaft to the driven shaft by overcoming the static friction of the gearing.

10. In mechanism of the class described, the combination of a drive shaft, a carrier secured to said drive shaft to rotate therewith, pinions arranged on said carrier for rotation relative thereto, an internal gear, an external gear, said pinions being in mesh with said internal and external gears, a rotatable box, bevel pinions carried by the box and rotatable relatively thereto, a pair of bevel gears meshing with said bevel pinions, a hollow shaft rotatably mounted on said drive shaft connecting said external gear with one of said bevel gears, a second hollow shaft mounted for rotation on the first hollow shaft connecting the internal gear with the other bevel gear, a driven shaft, a planetary gear set gearing with said drive shaft, said driven shaft and said box; and means to vary the speed of the second hollow shaft to vary the speed and direction of rotation of the driven shaft while the drive shaft is rotating at a constant speed.

11. In a mechanism of the class described, the combination of a drive shaft, a driven shaft, a planetary gear set gearing with said drive shaft and said driven shaft, a planetary locking gear set gearing with said drive shaft and said first planetary gear set, a stationary part, a second planetary locking gear set connected with said stationary part, means to couple and uncouple the second planetary locking gear set and said first planetary gear set, and means to operate each of said locking gear sets to cause variation of the speed and direction of rotation of said driven shaft while said drive shaft is rotating and said second planetary locking gear set is coupled to said first planetary gear set.

12. In a mechanism of the class described, the combination of a drive shaft, a driven shaft, a planetary gear set gearing with said drive shaft and said driven shaft, a planetary locking gear set gearing with said drive shaft and said first planetary gear set, a stationary part, a second planetary locking gear set connected with said stationary part, means to couple and uncouple the second planetary locking gear set and said first planetary gear set, an electric motor operatively connected with each of said first and second planetary locking gear sets, electric generators connected with said drive shaft, electrical connections between the motors and generators respectively adapted to operate the motors in inverse synchronism to vary the speed and direction of the driven shaft, while said drive shaft is rotating constantly in the same direction and the second planetary locking gear set is coupled to the first planetary gear set.

13. In a mechanism of the class described, the combination of a drive shaft, a driven shaft, a planetary gear set gearing with said drive shaft and said driven shaft, a planetary locking gear set gearing with said drive shaft and said first planetary gear set, a stationary part, a second planetary locking gear connected with the stationary part, means to couple and to uncouple the said second planetary locking gear set to the said first planetary gear set, an electric motor operatively connected with said first planetary locking gear set, an electric motor operatively connected with said second planetary locking gear set, and means to electrically operate the said motors in such a manner as to vary the speed and direction of rotation of said driven shaft, while the said driving shaft is rotating constantly in the same direction and said second planetary locking gear set is coupled with the said first planetary gear set.

14. In a mechanism of the class described, the combination of a drive shaft, a carrier secured to said drive shaft to rotate therewith, pinions arranged on said carrier for rotation relative thereto, an internal gear, an external gear, said pinions being in mesh with said internal and external gears, a driven shaft, a carrier secured to said driven shaft to rotate therewith, bevel pinions arranged on said second carrier for rotation relative thereto, bevel gears meshing with said bevel pinions, a shaft connecting one bevel gear with said external gear, a shaft connecting the other bevel gear with the said internal gear, and means adapted to vary the speed of said last mentioned shaft to thereby vary the speed of said driven shaft, while said drive shaft is rotating constantly.

15. In a mechanism of the class described, the combination of a drive shaft, a carrier secured to said drive shaft to rotate therewith, pinions arranged on said carrier for rotation relative thereto, an internal gear, an external gear, said pinions being in mesh with said internal and external gears, a driven shaft, a carrier secured to said driven shaft to rotate therewith, bevel pinions arranged on said second carrier for rotation relative thereto, bevel gears meshing with said bevel pinions, a shaft connecting one bevel gear with said external gear, a shaft connecting the other bevel gear with the said internal gear, an electric motor adapted to vary the speed of said last mentioned shaft to vary the speed of the said driven shaft, and a reversing means interposed between the said driven shaft and the load, to drive the load in the reverse direction.

16. As a new planetary locking gear arrangement, a drive shaft, a carrier secured to said drive shaft to rotate therewith, pinions arranged on said carrier for rotation relative thereto, an internal gear, an external gear, said pinions being in mesh wth said internal and said external gears, a driven shaft, a carrier secured to said driven shaft to rotate therewith, bevel pinions arranged on said second carrier for rotation relative thereto, bevel gears meshing with said bevel pinions, a hollow shaft connecting one bevel gear wth said external gear, and a second hollow shaft mounted for rotation on said first hollow shaft connecting the other bevel gear with the said internal gear.

Signed at Lorraine, in the county of Jefferson and State of New York, this 9th day of September, A. D. 1929.

STEPHEN A. FARRELL.